No. 854,924. PATENTED MAY 28, 1907.
B. J. BRUNKE.
DRAFT EQUALIZER.
APPLICATION FILED MAR. 14, 1906.

2 SHEETS—SHEET 1.

WITNESSES:

INVENTOR
B. J. Brunke
By Chandler & Chandler
Attorneys

No. 854,924.

PATENTED MAY 28, 1907.

B. J. BRUNKE.
DRAFT EQUALIZER.
APPLICATION FILED MAR. 14, 1906.

2 SHEETS—SHEET 2.

WITNESSES:

INVENTOR
B. J. Brunke
BY
Attorneys

UNITED STATES PATENT OFFICE.

BENJAMIN J. BRUNKE, OF CAMPBELL, NEBRASKA.

DRAFT-EQUALIZER.

No. 854,924. Specification of Letters Patent. Patented May 28, 1907.

Application filed March 14, 1906. Serial No. 306,029.

*To all whom it may concern:*

Be it known that I, BENJAMIN J. BRUNKE, a citizen of the United States, residing at Campbell, in the county of Franklin, State of Nebraska, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers and has for its object to provide a device of this character which will effectually equalize the draft of horses or other draft animals and which may be adjusted to suit varying conditions.

A further object of the invention is to provide means for securely bracing the doubletree and the pole of the vehicle at the point of connection of the said doubletree therewith.

Figure 1:
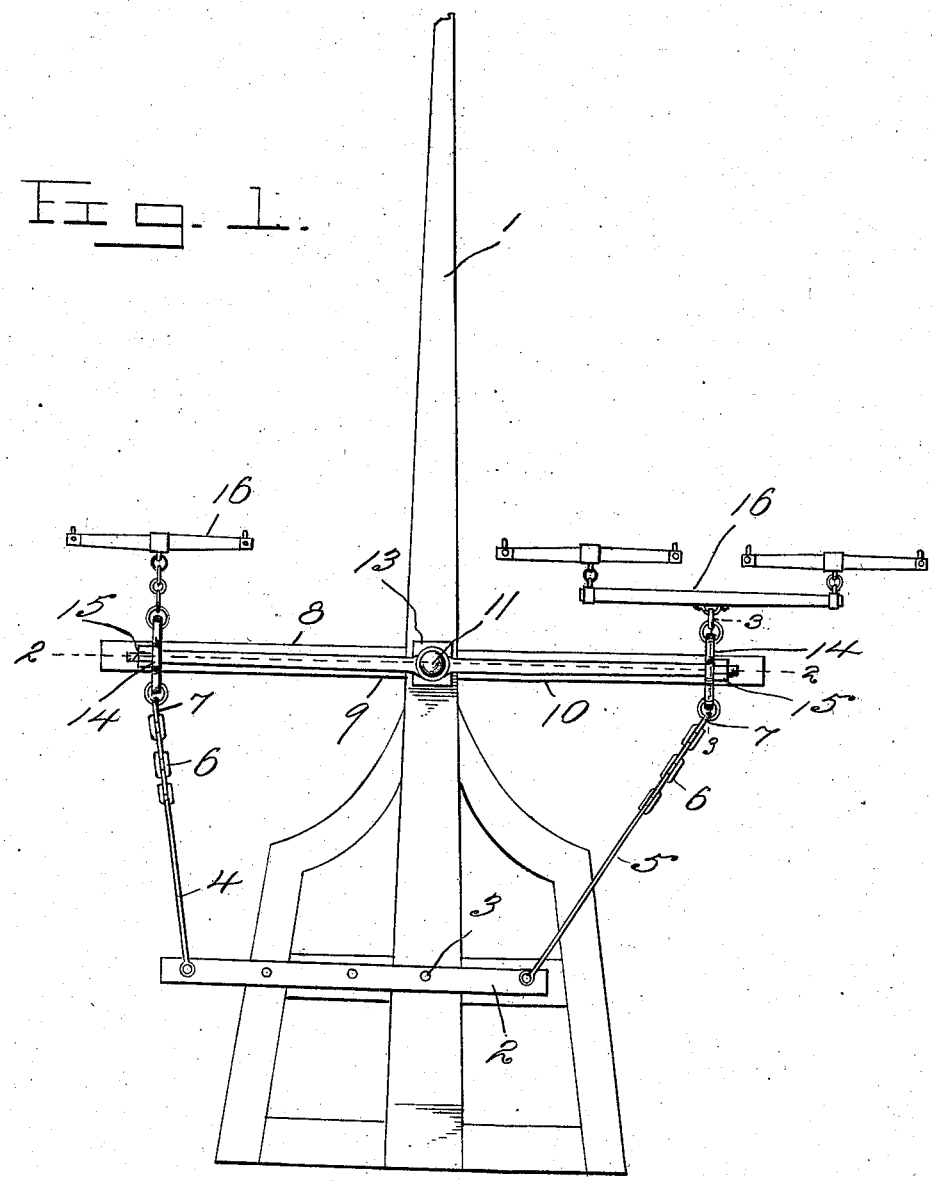
Figure 2:
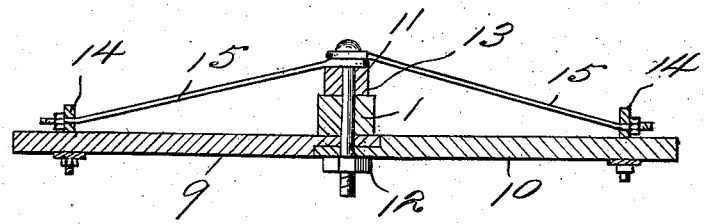
Figure 3:
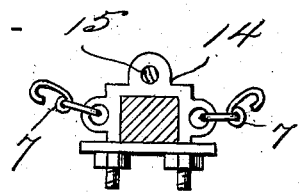
Figures 4, 5:
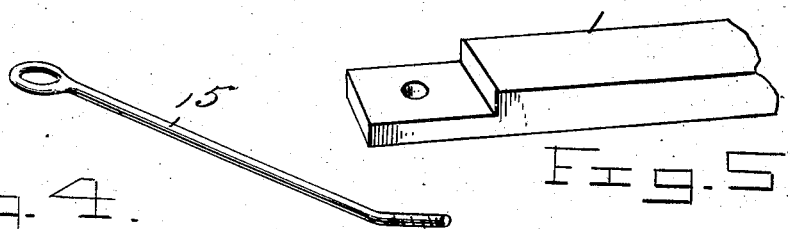

In the accompanying drawings, Figure 1 is a top plan view of the invention. Fig. 2 is a section on the line 2—2 of Fig. 1. Fig. 3 is a detail transverse sectional view on the line 3—3 of Fig. 1. Fig. 4 is a detail perspective view of one of the brace rods for the doubletree, and, Fig. 5 is a similar view of one section of the doubletree.

Referring to the drawings, the numeral 1 denotes the pole or tongue of a vehicle. An equalizing bar 2 is provided with a series of openings through which is interchangeably engaged a bolt 3 which also passes through the pole 1 and serves to pivotally connect the bar 2 with the pole. The outermost openings of the series are located at the ends of the bar 2 and engaged in the said openings are the rear ends of rods 4 and 5. Connected with the forward ends of the rods 4 and 5 are chains 6. The links of the chains 6 are arranged for interchangeable engagement with hooks 7 at the ends of the doubletree 8.

The doubletree 8 is formed of two sections 9 and 10 which have their inner ends recessed in their lower and upper faces respectively for the reception of the remaining end portion of the opposite member. Engaged through the tongue 1 of the vehicle and the said ends of the doubletree members is a bolt 11 and engaged upon the said bolt and beneath the said doubletree members 9 and 10 is a nut 12. The bolt 11 is also engaged through a block 13 upon the tongue of the vehicle, the said block serving to strengthen the connection of the doubletree with the tongue of the vehicle. The doubletree members 9 and 10 are each provided adjacent their outer ends with clips 14 provided with apertures. Brace rods 15 are provided with eye members at their inner ends through which the bolt 11 is engaged and have their outer ends engaged through apertures in the clips 14 and threaded to receive nuts 15', the said nuts serving to hold the doubletree members 9 and 10 in their proper position and to prevent sagging of the same. Connected with the ends of the doubletree members 9 and 10 are swingletrees or doubletrees 16 as may be desired.

What is claimed is:

In a device of the class described, the combination with a tongue, of a block disposed upon the tongue, a doubletree formed in sections, a bolt engaged through said block, tongue and said doubletree, apertured clips carried by said doubletree section, and rods having eye members engaged with said bolt and having their outer ends engaged through the apertures in said clips, an equalizer bar adjustably mounted upon the said tongue and adjustable connections between said equalizer bar and said doubletree members.

In testimony whereof, I affix my signature, in presence of two witnesses.

BENJAMIN J. BRUNKE.

Witnesses:
D. H. CLARK,
IRA RAMIE.